US008898322B2

(12) United States Patent
Kim et al.

(10) Patent No.: US 8,898,322 B2
(45) Date of Patent: Nov. 25, 2014

(54) CONTENTS RECEIVING APPARATUS OBTAINING APPLICATION CONTROL INFORMATION AND METHOD THEREOF (75) Inventors: Kwang-hyuk Kim, Suwon-si (KR);
Keum-yong Oh, Yongin-si (KR);
Sung-jin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 834 days.

(21) Appl. No.: 12/389,955

(22) Filed: Feb. 20, 2009

(65) Prior Publication Data
US 2010/0042738 A1  Feb. 18, 2010

(30) Foreign Application Priority Data

Aug. 14, 2008  (KR) .................. 10-2008-0079923

(51) Int. Cl.
*G06F 15/16* (2006.01)
*H04L 29/08* (2006.01)

(52) U.S. Cl.
CPC ............... *H04L 67/02* (2013.01); *H04L 67/32* (2013.01)
USPC ........................................................ 709/229

(58) Field of Classification Search
USPC ........................................................ 709/229
See application file for complete search history.

(56) References Cited

U.S. PATENT DOCUMENTS

| 5,799,191 | A |   | 8/1998  | Moriyasu et al. |           |
|-----------|---|---|---------|-----------------|-----------|
| 6,057,872 | A | * | 5/2000  | Candelore       | 725/23    |
| 6,948,183 | B1| * | 9/2005  | Peterka         | 725/25    |
| 7,140,033 | B1| * | 11/2006 | Durden et al.   | 725/80    |
| 7,296,162 | B2| * | 11/2007 | Wajs            | 713/178   |
| 2002/0152669 | A1 | * | 10/2002 | Harvanek     | 43/21.2   |
| 2003/0079234 | A1 | * | 4/2003  | Rasmussen    | 725/153   |
| 2003/0208778 | A1 | * | 11/2003 | Aratani et al.| 725/139  |
| 2004/0187014 | A1 | * | 9/2004  | Molaro       | 713/200   |
| 2005/0160045 | A1 | * | 7/2005  | Watanabe et al.| 705/51  |
| 2006/0280434 | A1 | * | 12/2006 | Suzuki et al. | 386/83   |
| 2007/0140650 | A1 | * | 6/2007  | Suzuki       | 386/83    |

FOREIGN PATENT DOCUMENTS

| EP | 1 349 376 A2 A3 | 10/2003 |
| JP | 2003-242072 A | 8/2003 |
| KR | 10-2007-0031218 A | 3/2007 |

OTHER PUBLICATIONS

Mexican Office Action, issued Jul. 14, 2011 in corresponding Mexican Patent Application No. MX/a/2009/005872.
Mexican Office Action issued Oct. 4, 2011, in corresponding Application No. MX/a/2009/005872.
Communication issued on Jan. 18, 2012 by the Mexican Patent Office in the counterpart Mexican Patent Application No. MX/a/2009/005872.
Communication dated Jun. 24, 2014 from the Korean Intellectual Property Office in a counterpart Korean application No. 10-2008-79923.
Communication from the partial European Patent Office issued Aug. 8, 2014 in a counterpart European Application No. 09163499.8.

\* cited by examiner

*Primary Examiner* — Karen Tang
(74) *Attorney, Agent, or Firm* — Sughrue Mion, PLLC (57) ABSTRACT

Provided are a contents receiving apparatus for obtaining application control information and a method thereof, the method comprising: receiving application control information, including effective duration information, from a server; determining whether a current control time point is within a time period represented by the effective duration information; and selectively requesting other application control information from the server in response to the determining.

14 Claims, 8 Drawing Sheets

```
<xs:element name="Start Time" value=Number type=second />
<xs:element name="Duration" value=Number type=second/>
<xs:element name="Application Description">
<xs:complexType>
<xs:all>
<xs:element name="Application ID 1" value=a0001 type=alphaNumeric />
<xs:element name="Application ID 2" value=a0002 type=alphaNumeric />
    . . .
<xs:element name="Application ID n" value=a000n type=alphaNumeric />
</xs:all>
</xs:complexType>
</xs:element>
```

FIG. 4

<EXECUTION START TIME> <EXECUTION DURATION>

Application Description

<APPLICATION ID 1> ···
<APPLICATION ID 2>
    ...
<APPLICATION ID n>

<Next ACI URL>

CONTENTS RECEIVING APPARATUS OBTAINING APPLICATION CONTROL INFORMATION AND METHOD THEREOF

CROSS-REFERENCE TO RELATED PATENT APPLICATION

This application claims the benefit of Korean Patent Application No. 10-2008-0079923, filed on Aug. 14, 2008 in the Korean Intellectual Property Office, the disclosure of which is incorporated herein in its entirety by reference.

BACKGROUND OF THE INVENTION

1. Field of the Invention

Apparatuses and methods consistent with the present invention relate to data broadcasting, and more particularly, to obtaining application control information for managing life cycles of an application over a data network during data broadcasting.

2. Description of the Related Art

With the development of digital broadcasting, technology called data broadcasting which transmits supplementary information in addition to broadcasting moving images, and applications that help create a more interactive environment for the viewers through broadcasting have been developed. In the data broadcasting technology, when the applications are transmitted, control information to control the transmitted applications is also provided, thereby dynamically managing life cycles of the applications.

In the related art, a method of transmitting applications and application control information using broadcasting streams uses a carousel transmission method. In the carousel transmission method, the applications and application control information are repeatedly received at the viewer's end at predetermined intervals. However, being subordinate to (or dependent on) the transmission cycles set by an operator on the transmitting side, the carousel transmission method may require the viewer to standby when the viewer desires to receive the applications and the application control information.

Recently, in order to solve this problem, a method has been introduced in which applications are provided using two-way communication between a server in the data network and a contents receiving apparatus. However, a service that dynamically manages life cycles of applications based on the application control information using a data network is still to be provided.

SUMMARY OF THE INVENTION

The present invention provides a contents receiving apparatus for obtaining application control information for managing life cycles of applications, using a data network, and a method thereof.

According to an aspect of the present invention, there is provided a method of obtaining application control information for a contents receiving apparatus, the method including receiving application control information, including effective duration information, from a server, determining whether a current control time point is within a time period represented by the effective duration information, and selectively requesting other application control information from the server in response to the determining.

The application control information may further include a next application control information uniform resource locator (URL) that is used after the time period represented by the effective duration information, wherein the selectively requesting the other application control information comprises, in response to determining that the current control time point is after the time period, requesting next application control information from the server using the next application control information URL.

The application control information may further include a previous application control information URL used before the time period represented by the effective duration information, wherein the selectively requesting the other application control information further includes, in response to determining that the current control time point is before the time period, requesting previous application control information from the server using the previous application control information URL.

When the current control time point is within the time period, the method may further include controlling ending of applications being executed at the current control time point and execution of new applications based on the received application control information.

The received application control information may be expressed using a markup language or an encoded bit stream descriptor.

The method may further include storing the application control information in a memory.

The method may further include receiving renewed application control information corresponding to the stored application control information, and renewing the stored application control information in the memory based on the received renewed application control information.

The effective duration information may be expressed by an execution start time and an execution duration.

According to another aspect of the present invention, there is provided a contents receiving apparatus for obtaining application control information, the apparatus including an application control information receiving unit which receives application control information, including effective duration information, from a server, an effective duration determining unit which determines whether a current control time point is within a time period represented by the effective duration information, and an application control information requesting unit which selectively requests other application control information from the server in response to the determination by the effective duration determining unit.

According to another aspect of the present invention, there is provided a computer readable recording medium having embodied thereon application control information comprising: an effective duration that is referred to determine whether application control information is effective; a previous application control information uniform resource locator (URL) used before the effective duration; and a next application control information URL used after the effective duration.

BRIEF DESCRIPTION OF THE DRAWINGS

The above and/or other aspects of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. In the drawings, like reference numerals denote like elements, and the size of the elements in the drawings may be exaggerated for clarity of description.

Figure 1:
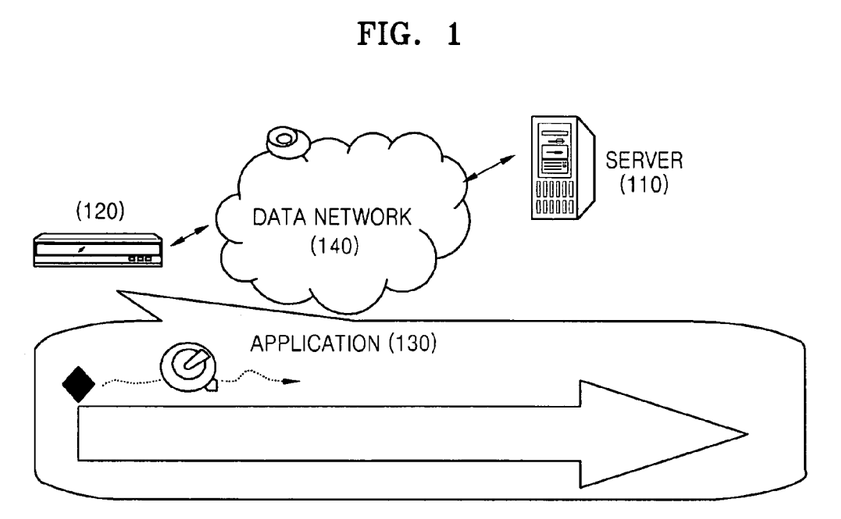
FIG. 1 illustrates a network environment which provides an application control service, according to an exemplary embodiment of the present invention.

FIG. 1 illustrates a network environment which provides an application control service, according to an exemplary embodiment of the present invention.

A contents receiving apparatus 120 that provides application control services is connected to a data network 140 via a cable modem or an Ethernet communication medium. The contents receiving apparatus 120 receives applications and application control information (ACI) from a server 110 on the internet, which is operated by an operator, or a media server in a home network. ACI is a concept comprising additional (e.g., supplementary) information for controlling applications, indicating an application information table (AIT) of data broadcasting and an application management table (AMT) of a storage device.

The contents receiving apparatus 120 may be various digital broadcasting receiving apparatuses including a set-top box (STB) or a personal video recorder (PVR).

Applications may be provided as HTML-based or XML-based web pages, or may be provided as Java Xlet which is designed for a contents receiving apparatus. Meanwhile, ACI is provided together with an application 130, thereby dynamically controlling life cycles of the application 130.

ACI includes information on respective applications to be executed for respective particular time periods (ACI effective duration), and thus can control life cycles of the respective applications. Also, ACI can be renewed by adding new applications to be executed for its own respective particular time period.

Figure 2:
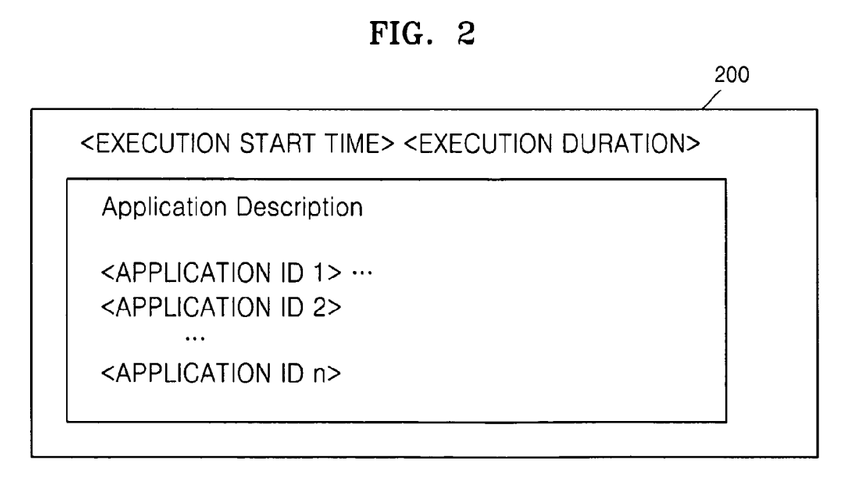
FIG. 2 illustrates a data structure of application control information (ACI), according to an exemplary embodiment of the present invention.

FIG. 2 illustrates a data structure of application control information (ACI) 200 according to an exemplary embodiment of the present invention. As illustrated in FIG. 2, ACI 200 includes at least an ACI effective duration and an application description (AD) field. According to the current exemplary embodiment of the present invention, an ACI effective duration is expressed by an execution start time and an execution duration, but other expressions may also be possible. An AD field describes a list of applications to be executed within the ACI effective duration. In this embodiment, Applications ID 1-ID n are to be executed in the ACI effective duration.

The execution start time denotes the start time of the applications described within the AD field, and the execution duration denotes a duration of executing the applications starting from the execution start time. The AD field includes a plurality of applications, and thus can control execution of a plurality of the applications within the ACI effective duration.

According to the current exemplary embodiment of the present invention, the contents receiving apparatus 120 can dynamically control life cycles of the applications by receiving ACI over the data network 140. In this case, since the contents receiving apparatus 120 is not subordinate to or dependent on the transmission periods set by the operator of the server 110 as in the related art carousel transmission method, the ACI can be received at a time point desired by the contents receiving apparatus 120.

Figure 3:
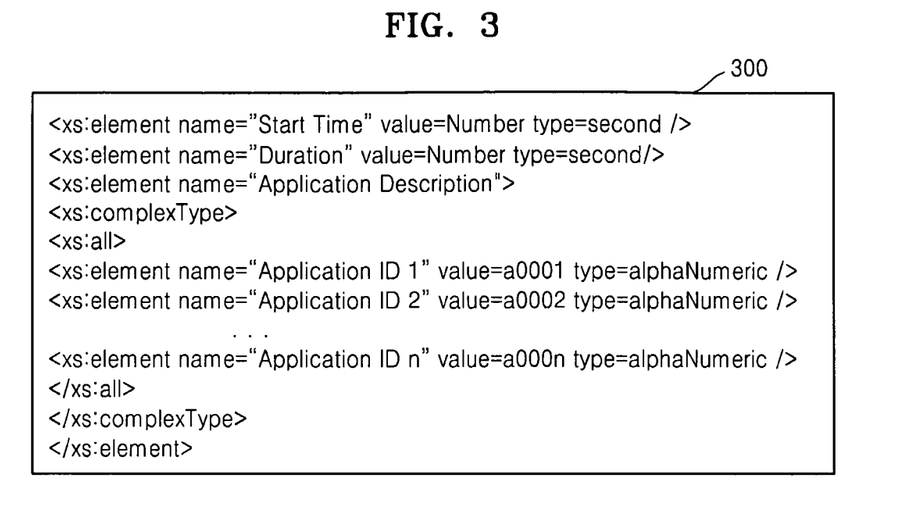
FIG. 3 illustrates the ACI of FIG. 2 using extensible markup language (XML), according to an exemplary embodiment of the present invention.

FIG. 3 illustrates ACI 300 described using XML, according to an exemplary embodiment of the present invention. ACI may be expressed by a markup language such as XML or HTML or by an encoded bit stream descriptor. Specifically, FIG. 3 illustrates the ACI 200, shown in FIG. 2, expressed using XML.

"Start Time" refers to an execution start time and can be described in seconds. "Duration" refers to an execution duration, which means a time period of executing applications from the execution start time. "Application Description" (AD) fields include a list of applications to be controlled within an ACI effective duration.

Figure 4:
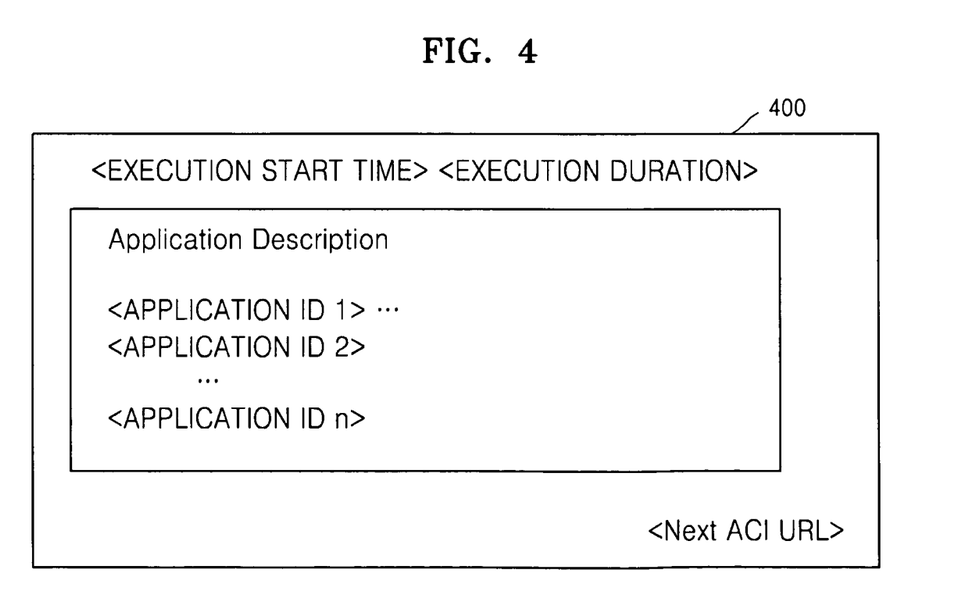
FIG. 4 illustrates an ACI data structure according to another embodiment of the present invention.

FIG. 4 illustrates an ACI data structure 400, according to another exemplary embodiment of the present invention. The ACI 400 of FIG. 4 includes next ACI URL information, which controls a period after the ACI effective duration, in addition to information illustrated in FIG. 2. The contents receiving apparatus 120 can receive the next ACI from the server 110 over a data network using the next ACI URL information.

According to the current exemplary embodiment of the present invention, the contents receiving apparatus 120 can receive the next ACI over a data network, and thus can have a continual time period divided into respective ACI effective durations in a forward direction and provide application control services for each of the ACI effective durations.

Figure 5:
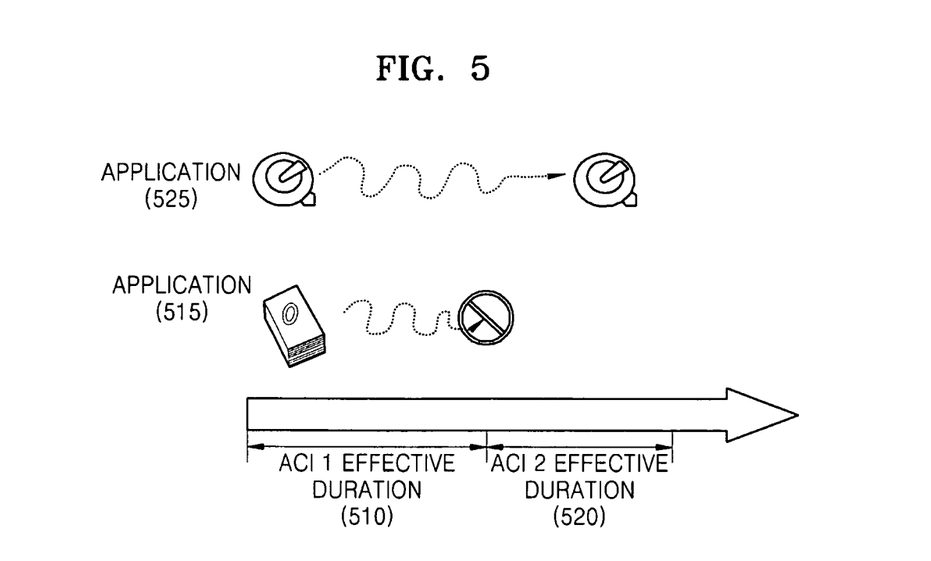
FIG. 5 illustrates an example of an application control process based on ACI, according to another exemplary embodiment of the present invention.

FIG. 5 illustrates an example of an application control process based on the ACI, according to another exemplary embodiment of the present invention. An ACI 1 effective duration 510 is described with ACI 1, and an ACI 2 effective duration 520 is described with ACI 2. Referring to FIG. 5, ACI 1 includes an application execution start time and an execution duration corresponding to the ACI 1 effective duration 510, and an AD field includes application 525 and application 515. Accordingly, the application 525 and the application 515 are executed within the ACI 1 effective duration 510.

A "Next ACI URL" field of ACI 1 includes ACI 2 URL information that controls the ACI 2 effective duration 520 after the ACI 1 effective duration 510. The contents receiving apparatus 120 can receive the next ACI from the server 110 over the data network 140 using the "Next ACI URL" field.

ACI 2 includes an application execution start time and an execution duration corresponding to the ACI 2 effective duration 520, and the AD field includes only application 525.

Accordingly, in the ACI 2 effective duration 520, execution of application 515 is ended, and only application 525 is executed.

Figure 6:
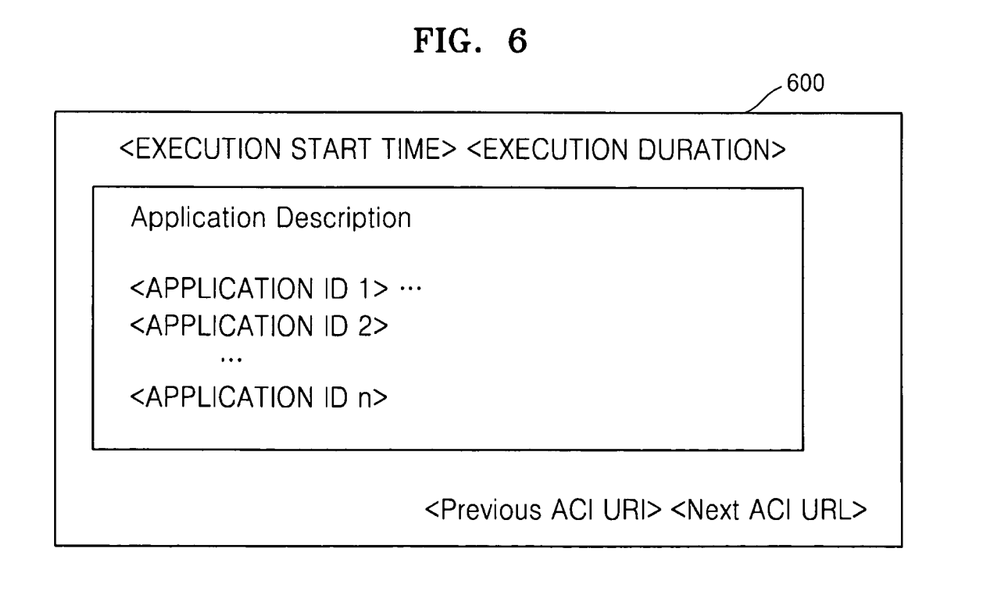
FIG. 6 illustrates an ACI data structure according to another exemplary embodiment of the present invention.

FIG. 6 illustrates an ACI data structure 600 according to another exemplary embodiment of the present invention. The ACI data structure comprises at least application IDs, effective durations during which the applications denoted by application IDs are controlled, a previous ACI URL used before the current effective durations, and a next ACI URL used after the current effective durations.

The contents receiving apparatus 120 can receive the previous ACI from the server 110 over the data network 140 through the previous ACI URL, and can receive the next ACI from the server 110 over the data network 140 through the next ACI URL.

Figure 7:
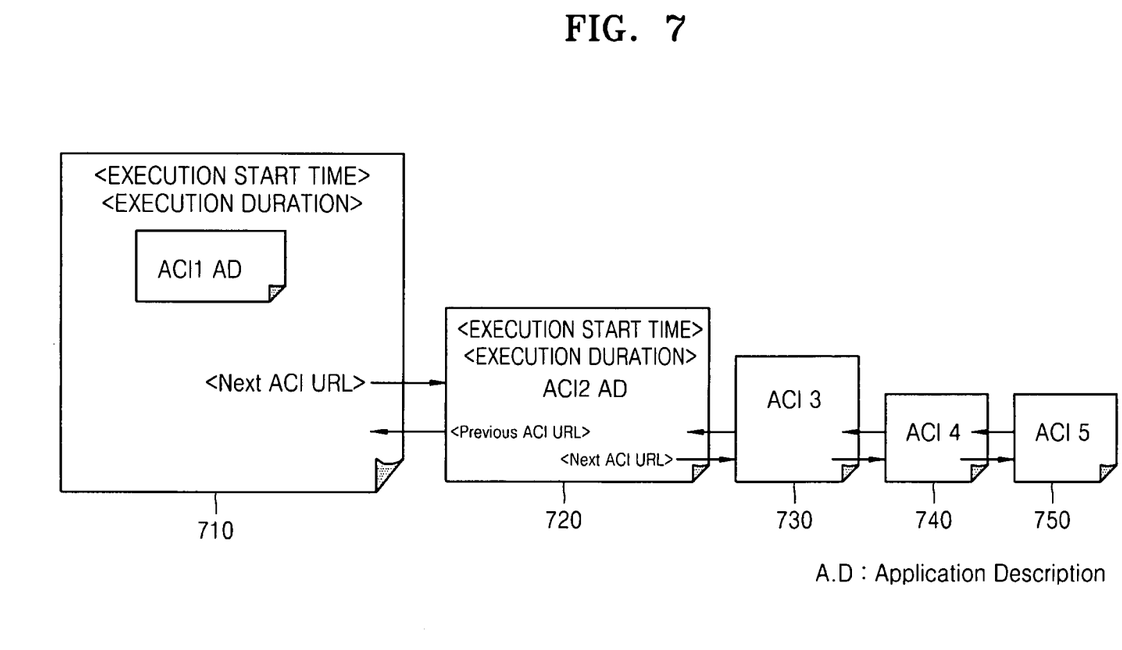
FIG. 7 illustrates a linked ACI list according to another exemplary embodiment of the present invention.

FIG. 7 illustrates a linked ACI list according to another exemplary embodiment of the present invention. Each ACI 710, 720, 730, 740, and 750 that controls an ACI effective duration includes a "Next ACI URL" field regarding a next ACI which controls a next effective duration and a "Previous ACI URL" field regarding a previous ACI which controls a previous effective duration. Each of the ACIs 710-750 is an individual node in the linked ACI list.

Meanwhile, each ACI 710, 720, 730, 740, and 750 can be stored in a memory in the contents receiving apparatus 120. In this case, when ACI is changed in the server 110, corresponding ACI stored in the contents receiving apparatus 120 needs to be renewed. To this end, the server 110 in the data network can generate multicast sockets for each of the contents receiving apparatuses to which the server 110 provides services, but this is ineffective in terms of network resource allocation and apparatus maintenance.

Accordingly, the contents receiving apparatus 120 receives information on whether the ACI is changed and the URL of the changed ACI, via broadcasting streams. The contents receiving apparatus 120, in response to sensing renewal through broadcasting streams, receives ACI with at least one item among the effective duration of the application and AD fields renewed, from the server 110 over the data network 140 through the URL received via the broadcasting streams. The contents receiving apparatus 120 renews ACI identified by an ACI ID in the memory.

According to the current exemplary embodiment of the present invention, the contents receiving apparatus 120 can receive next ACI and previous ACI via a data network, and thus can have a continuous time period divided into respective ACI effective durations and provide application control services for each of the effective durations.

Figure 8:
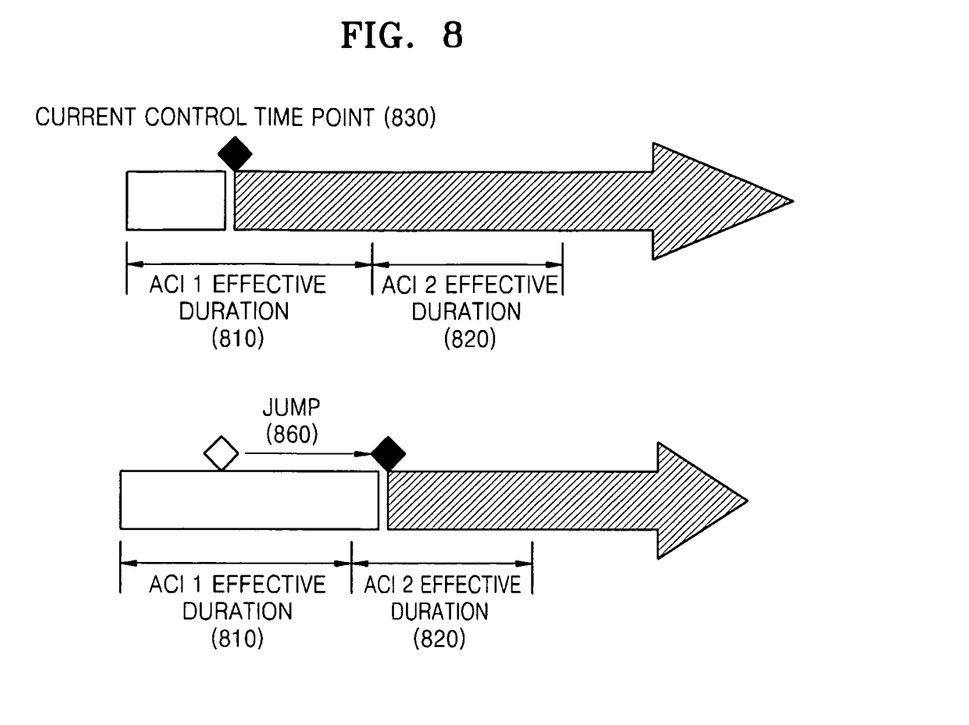
FIG. 8 illustrates an example of an application control process based on ACI, according to another exemplary embodiment of the present invention.

FIG. 8 illustrates an example of an application control service based on ACI, according to another embodiment of the present invention. An ACI 1 effective duration 810 is described with ACI 1, and an ACI 2 effective duration 820 is described with ACI 2. When a focus time 830, representing a current control time point, is forwarded from the ACI 1 effective duration 810 to the ACI 2 effective duration 820 (refer to JUMP 860), for example, when moved by a user input, the applications are controlled according to the ACI 2 which controls the ACI 2 effective duration 820. That is, applications that were being executed and not included in the ACI 2 are ended, and applications included in ACI 2 are executed from the focus time 830 till the expiration of the ACI 2 effective duration 820.

Figure 9:
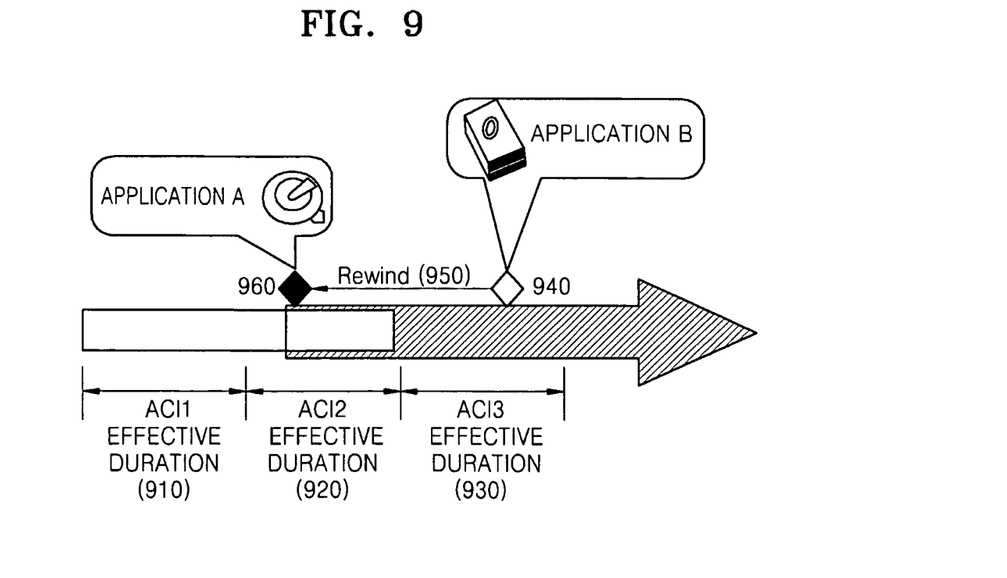
FIG. 9 illustrates an example of an application control process based on ACI, according to another exemplary embodiment of the present invention.

FIG. 9 illustrates an example of an application control service based on ACI, according to another embodiment of the present invention. An ACI 1 effective duration 910 is described with ACI 1, an ACI 2 effective duration 920 is described with ACI 2, and an ACI 3 effective duration 930 is described with ACI 3. When a focus time 940 representing a current control time point is returned from the ACI 3 effective duration 930 to the ACI 2 effective duration 920 (refer to 960), for example, when moved by a user input by a rewind operation 950, applications are controlled according to the ACI 2 which controls the ACI 2 effective duration 920. That is, applications that were being executed and not included in the ACI 2, for example, application B, are ended, and applications included in the ACI 2, for example, application A, are executed from the focus time 940 returned to point 960 until the expiration of the ACI 2 effective duration 920.

Figure 10:
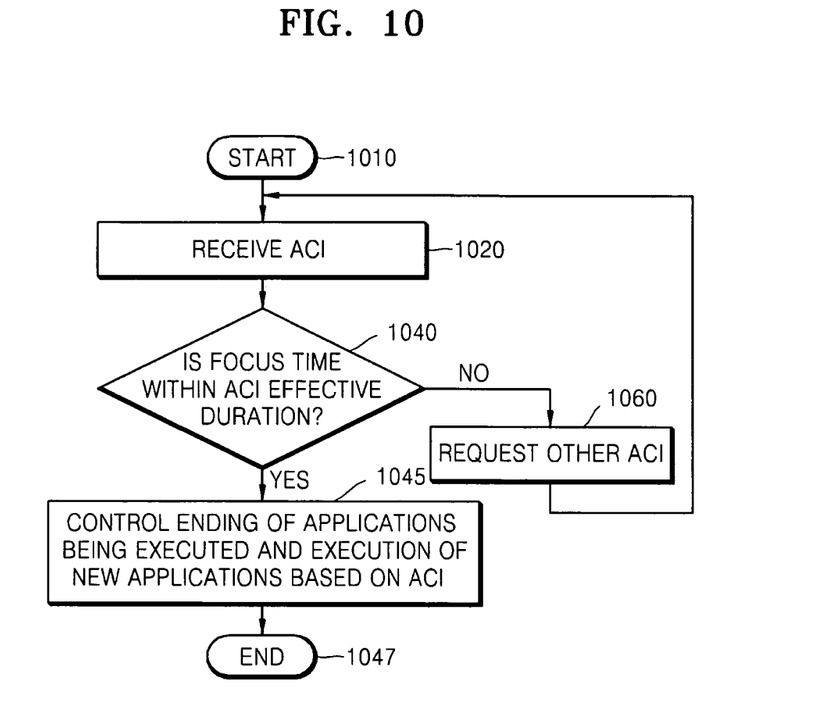
FIG. 10 is a flowchart illustrating an application control process according to an exemplary embodiment of the present invention.

FIG. 10 is a flowchart illustrating an application control process according to an exemplary embodiment of the present invention.

In operation 1010, the application control process is started. In operation 1020, the contents receiving apparatus 120 receives ACI from the server 110 over the data network 140. ACI that is received for the first time can be received by controlling a launcher application loaded in the contents receiving apparatus 120.

In operation 1040, it is determined whether a focus time representing a current control time point is within an ACI effective duration of the received ACI. When it is determined in operation 1040 that the focus time is within the ACI effective duration, the process proceeds to operation 1045, and, otherwise, when it is determined in operation 1040 that the focus time is not within the ACI effective duration, the process proceeds to operation 1060.

Operation 1045 is the case where a focus time is within the ACI effective duration, and ending of the applications being executed and execution of new applications are controlled based on the received ACI. In detail, in operation 1045, applications that are not denoted with application IDs of the received ACI and that are being executed are ended. Also, applications denoted with application IDs of the received ACI are executed from the focus time till the expiration of the ACI effective duration.

In operation 1047, an application control process with regard to a certain focus time is completed.

Operation 1060 is the case where a focus time is not within an ACI effective duration, and other ACI is requested to a server in a data network, and the application control process is repeated until a focus time is included in certain ACI effective duration.

Figure 11:
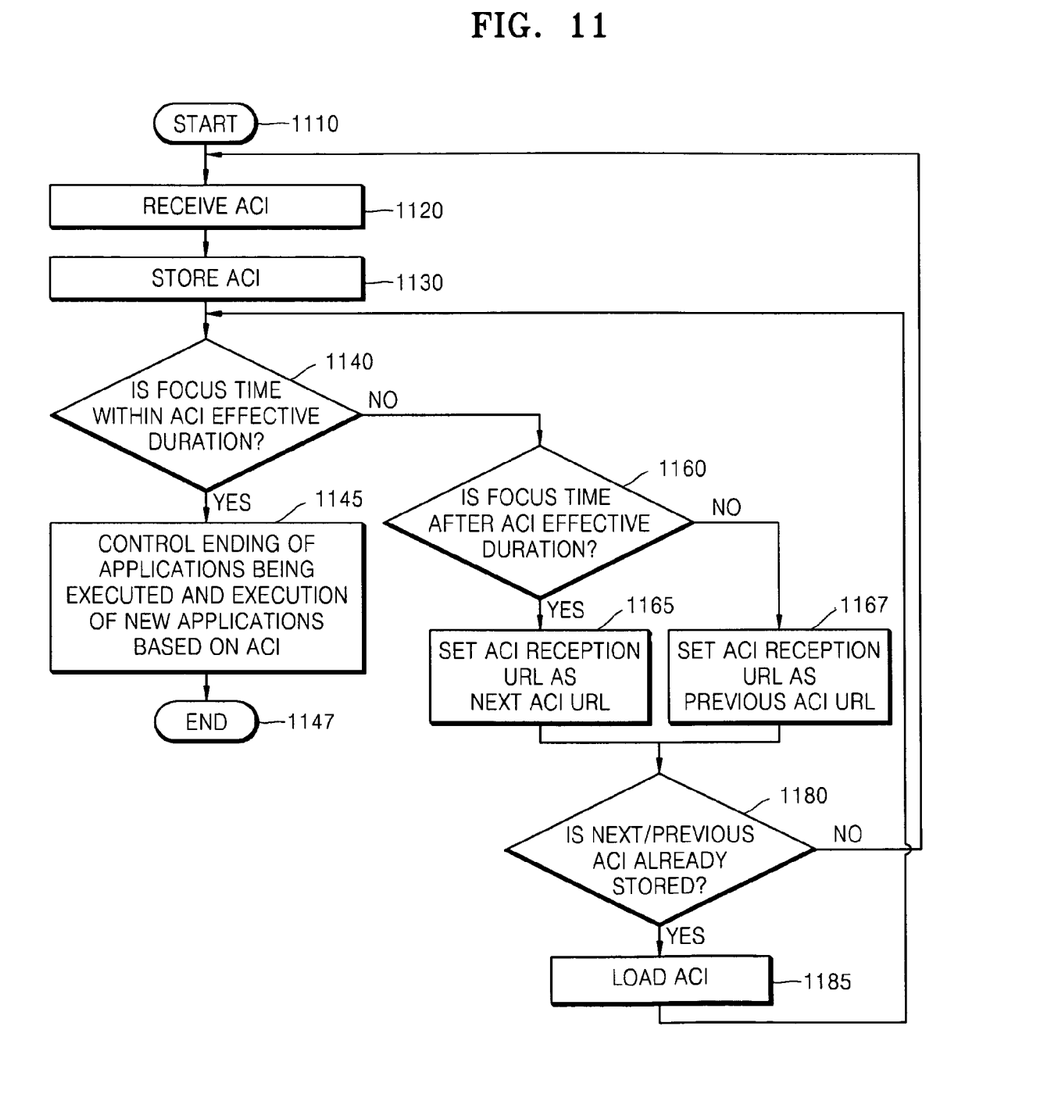
FIG. 11 is a flowchart illustrating an application control process according to another exemplary embodiment of the present invention.

FIG. 11 is a flowchart illustrating an application control process according to another exemplary embodiment of the present invention.

In operation 1110, the application control process is started. In operation 1120, the contents receiving apparatus 120 receives ACI from the server 110 over the data network 140. ACI that is received for the first time can be received by controlling a launcher application loaded in the contents receiving apparatus 120.

In operation 1130, the received ACI is stored in the memory.

In operation 1140, it is determined whether a focus time representing the current control time point is within an ACI effective duration of the ACI received in operation 1120. When it is determined in operation that a focus time is within the ACI effective duration, the process proceeds to operation 1145, and otherwise, the process proceeds to operation 1160.

Operation 1145 is the case where the focus time is within the ACI effective duration, wherein applications that are not denoted with application IDs of the received ACI and that are being executed are ended. Also, applications denoted with application IDs of the received ACI are executed from the focus time till the expiration of the ACI effective duration. In operation 1147, an application control service with regard to a certain focus time is completed.

In operation 1160, it is determined whether a focus time is after the ACI effective duration. When it is determined in operation 1160 that a focus time is after the ACI effective duration, the process proceeds to operation 1165, and otherwise, the process proceeds to operation 1167.

Operation 1165 is the case where a focus time is after the ACI effective duration, and the "Next ACI URL" is set as an ACI reception URL.

Operation 1167 is the case where a focus time is before the ACI effective duration (label C), and the "Previous ACI URL" is set as an ACI reception URL.

In operation 1180, it is determined whether the next ACI or the previous ACI has been received already from a server over a data network and stored in a memory. When it is determined in operation 1180 that the next or the previous ACI is stored in the memory already, the process proceeds to operation 1185, and otherwise, the process proceeds to operation 1120. Thus, the application control process is repeated until a focus time is included in a certain ACI effective duration.

In operation 1185, the ACI stored in the memory is loaded, and then the process proceeds to operation 1140. Thus the application control process is repeated until a focus time is included in a certain ACI effective duration.

Figure 12:
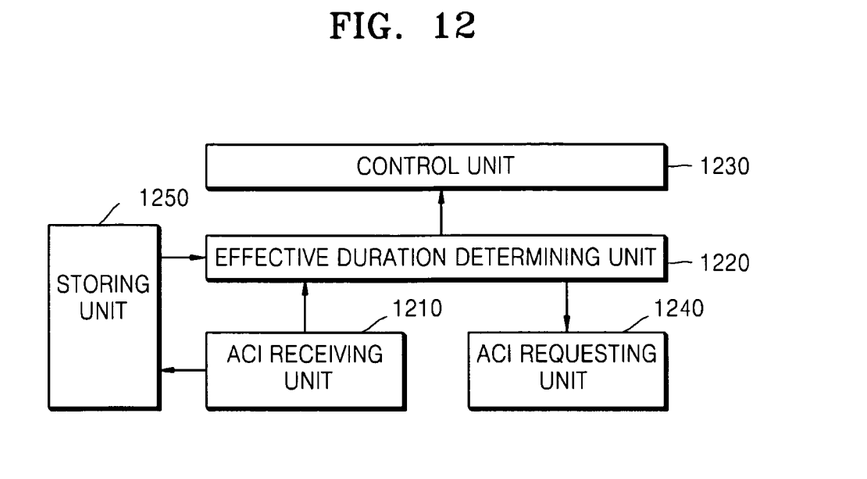
FIG. 12 is a block diagram illustrating a contents receiving apparatus providing an application control service, according to another exemplary embodiment of the present invention.

FIG. 12 is a block diagram illustrating a content receiving apparatus 120 providing an application control service, according to another exemplary embodiment of the present invention.

The contents receiving apparatus 120 includes an ACI receiving unit 1210, an effective duration determining unit 1220, a control unit 1230, an ACI requesting unit 1240, and a storing unit 1250.

The ACI receiving unit 1210 receives ACI, including information on effective durations, from a server over a data network. ACI can be expressed by a markup language or an encoded bit stream descriptor.

The effective duration determining unit 1220 determines whether a focus time representing the current control time point is within the effective duration of the received ACI.

When a focus time is within the effective duration of the ACI, the control unit 1230 controls ending of the application (s) currently being executed and execution of new applications based on the received ACI. The control unit 1230 controls such that applications that are not denoted with application IDs included in the received ACI and that are being executed are ended, and applications that are newly denoted with application IDs included in the received ACI are executed from the focus time till the expiration of the effective duration of the ACI.

When the focus time is not within the ACI effective duration, the ACI requesting unit 1240 requests other ACI to a server over the data network. To this end, ACI further includes a next ACI URL that is used after the effective duration of the ACI. When the focus time is after the ACI effective duration, the ACI requesting unit 1240 requests next ACI to the server over the data network via the next ACI URL. Here, when next ACI is already stored in a memory, the ACI requesting unit 1240 requests the next ACI from the storing unit 1250.

Also, ACI further includes a previous ACI URL that is used before the effective duration of the ACI. When a focus time is before the effective duration of the ACI, the ACI requesting unit 1240 requests previous ACI to a server over the data network via the previous ACI URL. Here, when the previous ACI is already stored in a memory, the ACI requesting unit 1240 requests the previous ACI from the storing unit 1250.

The storing unit 1250 stores ACI received by the ACI receiving unit 1210 in a storage medium such as a memory or a hard disk.

Meanwhile, although not illustrated in the drawings, the contents receiving apparatus 120 may selectively further include a renewing unit that receives ACI having at least one of its items renewed among applications IDs and ACI effective durations, from a server over the data network, and renews ACI in the memory.

The exemplary embodiments of the present invention can be written as computer programs and can be implemented in general-use digital computers that execute the programs using a computer readable recording medium.

Examples of the computer readable recording medium include magnetic storage media (e.g., ROM, floppy disks, hard disks, etc.), and optical recording media (e.g., CD-ROMs, or DVDs).

The present invention can also be embodied as computer readable codes on a computer readable transmission medium. For example, the computer readable transmission medium could be carrier waves (such as data transmission through the Internet). The computer readable transmission medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of obtaining application control information for a contents receiving apparatus, the method comprising:

receiving application control information, including effective duration information, from a server;

determining whether a current control time point is within a time period represented by the effective duration information;

automatically selectively requesting other application control information from the server in response to the determining;

receiving said other application control information from the server in response to the selectively requesting;

storing the application control information in a memory;

receiving renewed application control information corresponding to the stored application control information; and renewing the stored application control information in the memory based on the received renewed application control information, wherein said receiving application control information and said automatically selectively requesting are at a time point needed by the contents receiving apparatus and not dependent on transmission periods, and wherein the application control information the renewed application control information are temporally linked to each other using previous and next links.

2. The method of claim 1, wherein the received application control information further comprises a next application control information uniform resource locator (URL) that is used after the time period represented by the effective duration information, wherein the selectively requesting the other application control information comprises, in response to determining that the current control time point is after the time period, requesting next application control information from the server using the next application control information URL.

3. The method of claim 2, wherein the application control information further comprises a previous application control information URL used before the time period represented by the effective duration information,
wherein the selectively requesting the other application control information further comprises, in response to determining that the current control time point is before the time period, requesting previous application control information from the server using the previous application control information URL.

4. The method of claim 1, wherein when the current control time point is within the time period, the method further comprises:
controlling ending of applications being executed at the current control time point and execution of new applications based on the received application control information.

5. The method of claim 1, wherein the received application control information is expressed using a markup language or an encoded bit stream descriptor and wherein the received application control information comprises information for controlling application, indicating an application information table of data broadcasting and an application management table.

6. The method of claim 1, wherein the effective duration information is expressed by an execution start time and an execution duration.

7. A contents receiving apparatus for obtaining application control information, the apparatus comprising:
an application control information receiving unit which receives application control information, including effective duration information, from a server;
an effective duration determining unit which determines whether a current control time point is within a time period represented by the effective duration information;
an application control information requesting unit which automatically selectively requests other application control information from the server in response to the determination by the effective duration determining unit;
a storing unit which stores the received application control information in a memory; and
a renewing unit which receives renewed application control information from the server, the renewed application control information corresponding to the stored application control information, and renews the stored application control information in the memory based on the received renewed application control information,
wherein the application control information receiving unit receives the other application control information in response to the selectively requesting, and
wherein the contents receiving apparatus is implemented in hardware,
wherein said receiving application control information and said automatically selectively requesting are at a time point needed by the contents receiving apparatus and not dependent on transmission periods, and
wherein the application control information the renewed application control information are temporally linked to each other using previous and next links.

8. The contents receiving apparatus of claim 7, wherein the received application control information further comprises a next application control information uniform resource locator (URL) that is used after the time period represented by the effective duration information,
wherein the application control information requesting unit requests, in response to determining that the current control time point is after the time period, next application control information from the server using the next application control information URL.

9. The contents receiving apparatus of claim 8, wherein the received application control information further comprises a previous application control information URL which is used before the time period represented by the effective duration information,
wherein the application control information requesting unit requests, in response to determining that the current control time point is before the time period, previous application control information from the server using the previous application control information URL.

10. The contents receiving apparatus of claim 7, further comprising:
a control unit which controls, when the current control time point is within the time period, ending of applications being executed at the current control time point and execution of new applications based on the received application control information.

11. The contents receiving apparatus of claim 7, wherein the received application control information is expressed by a markup language or encoded bit stream descriptor.

12. The contents receiving apparatus of claim 7, wherein the effective duration information is expressed by an execution start time and an execution duration.

13. A non-transitory computer readable recording medium having embodied thereon a computer program for executing a method of using application control information to control operation of applications, the method comprising:
receiving application control information, including effective duration information, from a server;
determining whether a current control time point is within a time period represented by the effective duration information;
automatically selectively requesting other application control information from the server in response to the determining;
receiving said other application control information from the server in response to the selectively requesting; and
determining, based on the application control information, whether to continue or end execution of currently running applications, and whether to start execution of new applications,
wherein said receiving application control information and said automatically selectively requesting are at a time point needed by the contents receiving apparatus and not dependent on transmission periods,
wherein the application control information is stored on the computer readable recording medium and comprises:
an effective duration used to determine whether application control information is effective;
a previous application control information uniform resource locator (URL) indicative of a previous application control information used before the effective duration; and
a next application control information URL indicative of a next application control information used after the effective duration.

14. A non-transitory computer readable recording medium having embodied thereon a computer program for executing a method of obtaining application control information for a contents receiving apparatus, the method comprising:

receiving application control information, including effective duration information, from a server;
determining whether a current control time point is within a time period represented by the effective duration information;
automatically selectively requesting other application control information from the server in response to the determining,
receiving said other application control information from the server in response to the selectively requesting;
storing the application control information in a memory;
receiving renewed application control information corresponding to the stored application control information; and
renewing the stored application control information in the memory based on the received renewed application control information,
wherein said receiving application control information and said automatically selectively requesting are at a time point needed by the contents receiving apparatus and not dependent on transmission periods, and
wherein the application control information the renewed application control information are temporally linked to each other using previous and next links.

* * * * *